(12) United States Patent
Young

(10) Patent No.: US 6,477,601 B1
(45) Date of Patent: Nov. 5, 2002

(54) SCSI BUS FREE PHASE MANAGEMENT STRUCTURE AND METHOD OF OPERATION FOR PARALLEL SCSI HOST ADAPTER INTEGRATED CIRCUITS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/343,323

(22) Filed: Jun. 30, 1999

(51) Int. Cl.[7] .............................................. G06F 13/24
(52) U.S. Cl. ........................................ 710/260; 710/261
(58) Field of Search ................................ 710/307, 311, 710/313, 314, 260, 261, 262–269

(56) References Cited

U.S. PATENT DOCUMENTS

| | | | |
|---|---|---|---|
| 5,313,588 A | * | 5/1994 | Nagashige et al. ............. 710/5 |
| 5,659,690 A | * | 8/1997 | Stuber et al. ................ 710/307 |
| 5,845,154 A | * | 12/1998 | Krakirian .................... 710/105 |

* cited by examiner

*Primary Examiner*—Peter Wong
*Assistant Examiner*—Tim Vo
(74) *Attorney, Agent, or Firm*—Gunnison, McKay & Hodgson, L.L.P.; Forrest Gunnison

(57) ABSTRACT

A parallel SCSI host adapter integrated circuit includes a Bus Free management circuit having a plurality of input lines coupled to SCSI bus control terminals of said parallel SCSI host adapter integrated circuit; a Bus Free phase interrupt disable line; a clear line; a Bus Free phase status line; and a Bus Free phase interrupt line. The Bus Free management circuit automatically generates an active signal on said Bus Free phase status line following receipt of (i) one of a selection complete signal and a reselection complete signal on said plurality of input lines; and (ii) a Bus Free phase signal on said plurality of input lines. The parallel SCSI host adapter integrated circuit also includes a sequencer coupled to said clear line, to said Bus Free phase status line, and to said Bus Free phase interrupt disable line. The sequencer generates an active signal on said Bus Free phase interrupt disable line when a Bus Free phase is expected. The sequencer also generates an active signal on said clear line after determining that an active signal is on said Bus Free phase status line.

12 Claims, 6 Drawing Sheets

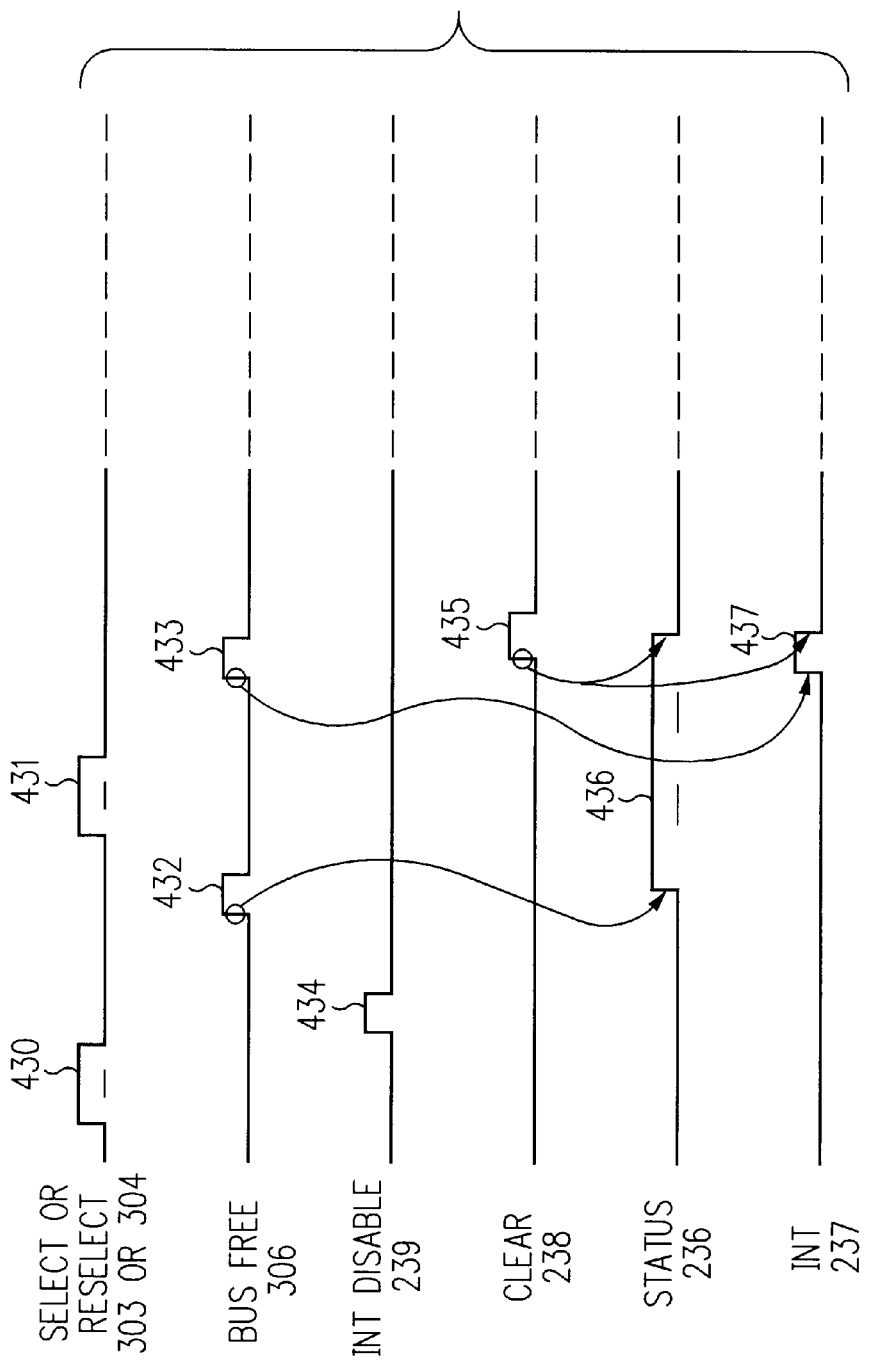

SCSI BUS FREE PHASE MANAGEMENT STRUCTURE AND METHOD OF OPERATION FOR PARALLEL SCSI HOST ADAPTER INTEGRATED CIRCUITS

BACKGROUND OF THE INVENTION

1. Field of the Invention

This invention relates generally to data transfers over a SCSI bus, and in particular to detecting and managing signals associated with the SCSI Bus Free phase on a SCSI bus.

2. Description of Related Art

Prior single chip parallel SCSI host adapters have included a plurality of modules and an on-chip processor that controlled operation of the modules. For example, see U.S. Pat. No. 5,659,690, entitled "Programmably Configurable Host Adapter Integrated Circuit Including a RISC Processor," issued on Aug. 19, 1997 to Stuber et al., which is incorporated herein by reference.

A typical parallel SCSI host adapter 100 included a SCSI module 130 (FIG. 1), a sequencer 120, a data FIFO memory circuit 160, a memory 140, and a host interface module 110 that were interconnected by an internal chip I/O bus CIOBUS, which was used for control of host adapter integrated circuit 100 both by a host microprocessor 170 through a host adapter driver 165 and by sequencer 120. The combination of host adapter driver 165, sequencer 120, and SCSI module 130 were used for controlling both synchronous and asynchronous transfers over SCSI bus 150.

One of the functions performed by host adapter integrated circuit 100 was detection of both expected and unexpected Bus Free phases on SCSI bus 100. A Bus Free phase is the interval when no SCSI device is connected to SCSI bus 150. The Bus Free phase is expected by host adapter 100 in specific situations, e.g., after assertion of acknowledge signal ACK to a disconnect completion, after a Bus Device Reset message, or after an Abort message. An unexpected Bus Free phase is one that occurs as a result of an accident any time during a SCSI information transfer.

The Bus Free phase detection technique used in host adapter 100 was a simple level detector. The management of the Bus Free phase required an appreciable amount of sequencer firmware. Moreover, since the Bus Free phase management occurred in time critical sequences, execution of this appreciable amount of sequencer firmware affected the performance of host adapter 100.

For example, after every successful selection of a target and again after reselection by a target, sequencer 120 cleared the Bus Free phase status associated with a previous selection or reselection, and re-enabled a Bus Free phase interrupt. This required execution of three sequencer instructions in each instance: a first instruction to clear the Bus Free phase status; a second instruction to enable the Bus Free phase interrupt; and a third instruction to check the SCSI bus phase status to assure that a Bus Free phase did not occur immediately prior to enabling the interrupt.

The three instructions could not be executed before a completed selection or reselection because at that time SCSI bus 150 typically was in the Bus Free phase. Therefore, execution of the instructions would result in a status of Bus Free phase and generation of the associated interrupt. Since the three instructions had to be executed after the completed selection or reselection, the instructions were typically executed while a target was waiting for assertion of acknowledge signal ACK.

The Bus Free phase interrupt was enabled when the Bus Free phase was not expected. In the event of an unexpected Bus Free phase on SCSI bus 150, which meant a catastrophic drop-off of a target from SCSI bus 150, the Bus Free phase interrupt was generated which halted sequencer 120 and prevented further execution of a sequencer control block (SCB). In addition, an interrupt was asserted to host adapter driver 165 notifying driver 165 of the catastrophe.

In response to the interrupt, host adapter driver 165 determined the cause of the interrupt by scanning status bits in host adapter 100. To prevent another redundant interrupt due to the Bus Free condition, host adapter driver 165 disabled the Bus Free phase interrupt, and cleared the status of Bus Free phase.

At points during the SCSI bus phase sequence when sequencer 120 expected a Bus Free phase, sequencer 120 disabled the Bus Free phase interrupt just before the Bus Free phase was expected. This prevented generation of the interrupt to host adapter driver 165 when the Bus Free phase occurred. The Bus Free phase always occurred after certain messages and so sequencer 120 disabled the Bus Free phase interrupt just prior to asserting acknowledge signal ACK in response to one of the messages.

However, the Bus Free phase status detection was always enabled. The Bus Free phase status was latched for sequencer 120 because the Bus Free phase could be very short, and could be missed by sequencer 120. Sequencer 120 always waited for the Bus Free phase status when it was expected, because some targets asserted another request signal REQ instead of going to the Bus Free phase when a parity error occurred. Sequence 120 has to be able to detect this situation, which in turn required waiting for the Bus Free phase status.

SUMMARY OF THE INVENTION

According to the principles of this invention, a Bus Free management circuit in a SCSI module of a parallel SCSI host adapter integrated circuit reduces the number of sequencer firmware instructions that must be executed prior to responding to an assertion of a request signal REQ on a SCSI bus following a selection complete or a reselection complete. Consequently, the parallel SCSI host adapter integrated circuit asserts acknowledge signal ACK more quickly than in the prior art host adapter integrated circuit that required execution of at least three sequencer firmware instructions to manage the Bus Free phase detection prior to assertion of acknowledge signal ACK.

The parallel SCSI host adapter integrated circuit of this invention includes a Bus Free management circuit having a plurality of input lines coupled to SCSI bus control terminals of the parallel SCSI host adapter integrated circuit; a Bus Free phase interrupt disable line; a clear line; a Bus Free phase status line; and a Bus Free phase interrupt line. The Bus Free management circuit automatically generates an active signal on the Bus Free phase status line following receipt of (i) one of a selection complete signal and a reselection complete signal on the plurality of input lines; and (ii) a Bus Free phase signal on the plurality of input lines.

The parallel SCSI host adapter integrated circuit also includes a circuit coupled to the clear line, to the Bus Free phase status line, and to the Bus Free phase interrupt disable line. The circuit generates an active signal on the Bus Free phase interrupt disable line when a Bus Free phase is expected. The circuit also generates an active signal on the clear line after determining that an active signal is on the Bus Free phase status line.

In one embodiment, the circuit is an on-chip sequencer. In another embodiment, the circuit includes a register that is connected to the clear line. When the register is set either by the sequencer or by a host adapter driver, the active signal is driven on the clear line. The circuit also includes hardware that detects the SCSI bus phase and automatically generates, without any processor intervention, the active signal on the Bus Free phase interrupt disable line when a Bus Free phase is expected.

In one embodiment, the Bus Free management circuit further includes an enable circuit coupled to the plurality of input lines and to the Bus Free phase interrupt disable line. The enable circuit includes an enable line and an output line. The Bus Free management circuit also includes a status generation circuit connected to the enable line and to the clear line, and having an output terminal connected to the Bus Free phase status line. The Bus Free management circuit further includes an interrupt generation circuit connected to the enable line, to the clear line, and to the output line, and having an output terminal connected to the Bus Free phase interrupt line.

A method of this invention first enables automatic hardware generation of a SCSI Bus Free phase status signal upon receipt of an active selection done signal or an active reselection done signal by a hardware circuit. Next, the method generates automatically an active Bus Free phase status signal upon receipt of an active SCSI Bus Free phase signal by the hardware circuit.

The method also enables automatic hardware generation of a SCSI Bus Free phase interrupt signal upon receipt of the active selection done signal or the active reselection done signal. However, the method then disables the automatic hardware generation of the SCSI Bus Free phase interrupt signal when a SCSI Bus Free phase is expected. When the Bus Free interrupt is enabled, the method includes generating automatically an active Bus Free phase interrupt upon receipt of the active SCSI Bus Free phase signal by the hardware circuit. The method also includes clearing the active Bus Free phase status signal independent of another active selection done signal or another active reselection done signal by the hardware circuit.

BRIEF DESCRIPTION OF THE DRAWING

FIGS. 4A and 4B are timing diagrams that illustrate the operation of the SCSI Bus Free phase management circuit according to the principles of this invention.

In the following description, elements with the same reference numeral are the same or equivalent elements.

DETAILED DESCRIPTION OF THE INVENTION

Figure 1:
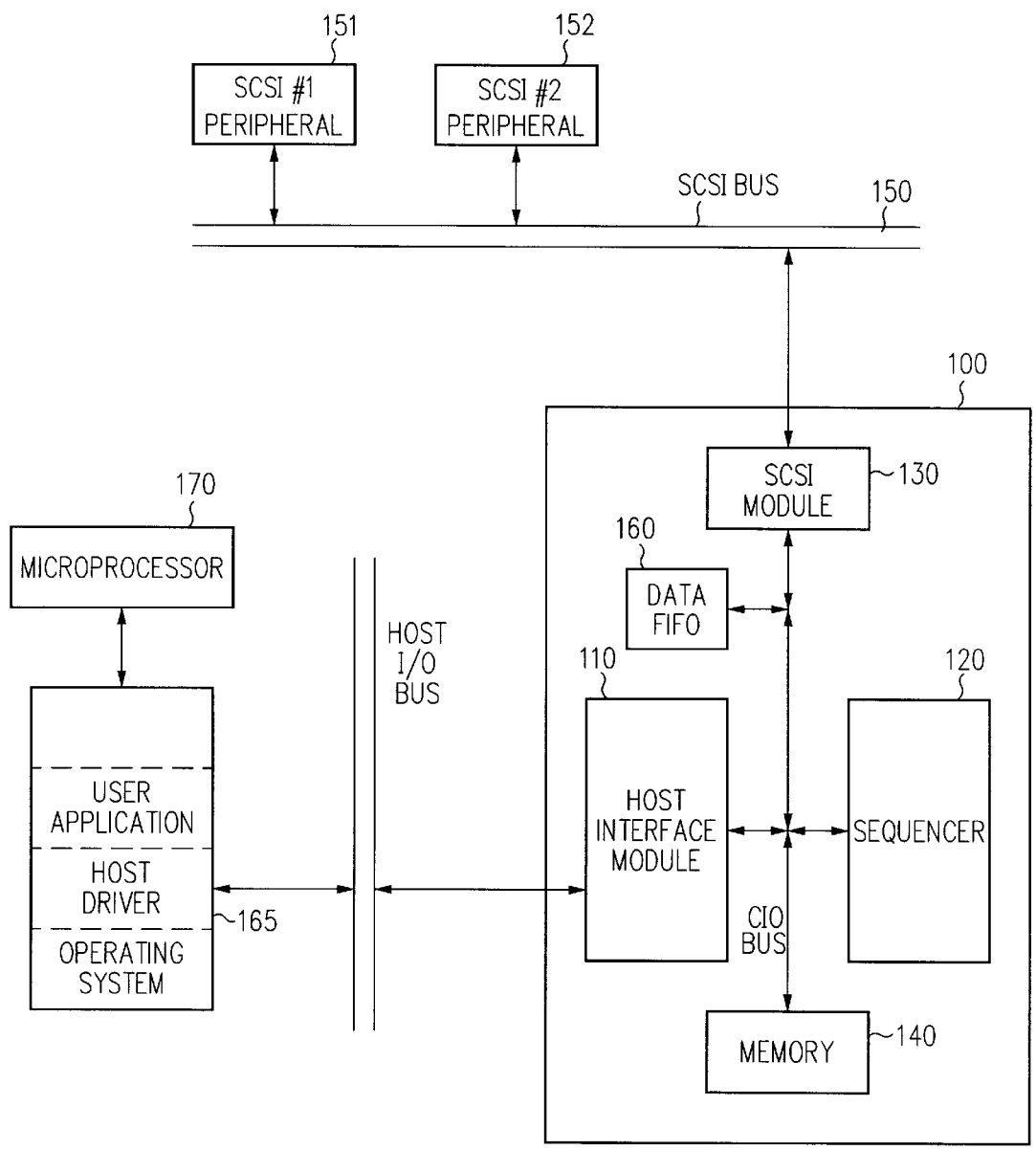
FIG. 1 is a block diagram of a prior art host adapter integrated circuit.

According to the principles of this invention, a novel Bus Free management circuit 235 in a SCSI module 230 of a parallel SCSI host adapter integrated circuit 200 reduces the number of sequencer firmware instructions that must be executed prior to responding to an assertion of a request signal REQ on a SCSI bus 250 independent of a selection complete or a reselection complete on SCSI bus 250. Consequently, parallel SCSI host adapter integrated circuit 200 asserts acknowledge signal ACK more quickly than in the prior art host adapter integrated circuit that required execution of at least three sequencer firmware instructions to manage the Bus Free phase detection prior to assertion of acknowledge signal ACK in response to an assertion of a request signal REQ on a SCSI bus 250 for a selection complete or a reselection complete.

In addition to sequencer 220 and SCSI module 230, parallel SCSI host adapter integrated circuit 200 also includes a data FIFO 260, a host interface module 210, and a memory 230. Each of these elements and internal bus 280 are known to those of skill in the art, because they are similar to prior art elements, with the exceptions described herein. SCSI module 230 includes elements other than those illustrated in FIG. 2, as do the other modules. To avoid detracting from the invention, only the specific elements needed to understand the invention are shown in FIG. 2.

As an example of modules suitable for use with this invention, see for example commonly assigned U.S. Pat. No. 5,659,690, entitled "Programmably Configurable Host Adapter Integrated Circuit Including a RISC Processor," issued on Aug. 19, 1997 to Stuber et al., and commonly assigned U.S. Pat. No. 5,838,950, entitled "Method of Operation of a Host Adapter Integrated Circuit," issued on Nov. 17, 1998 to B. Arlen Young et al., each of which is incorporated herein by reference.

Figure 2:
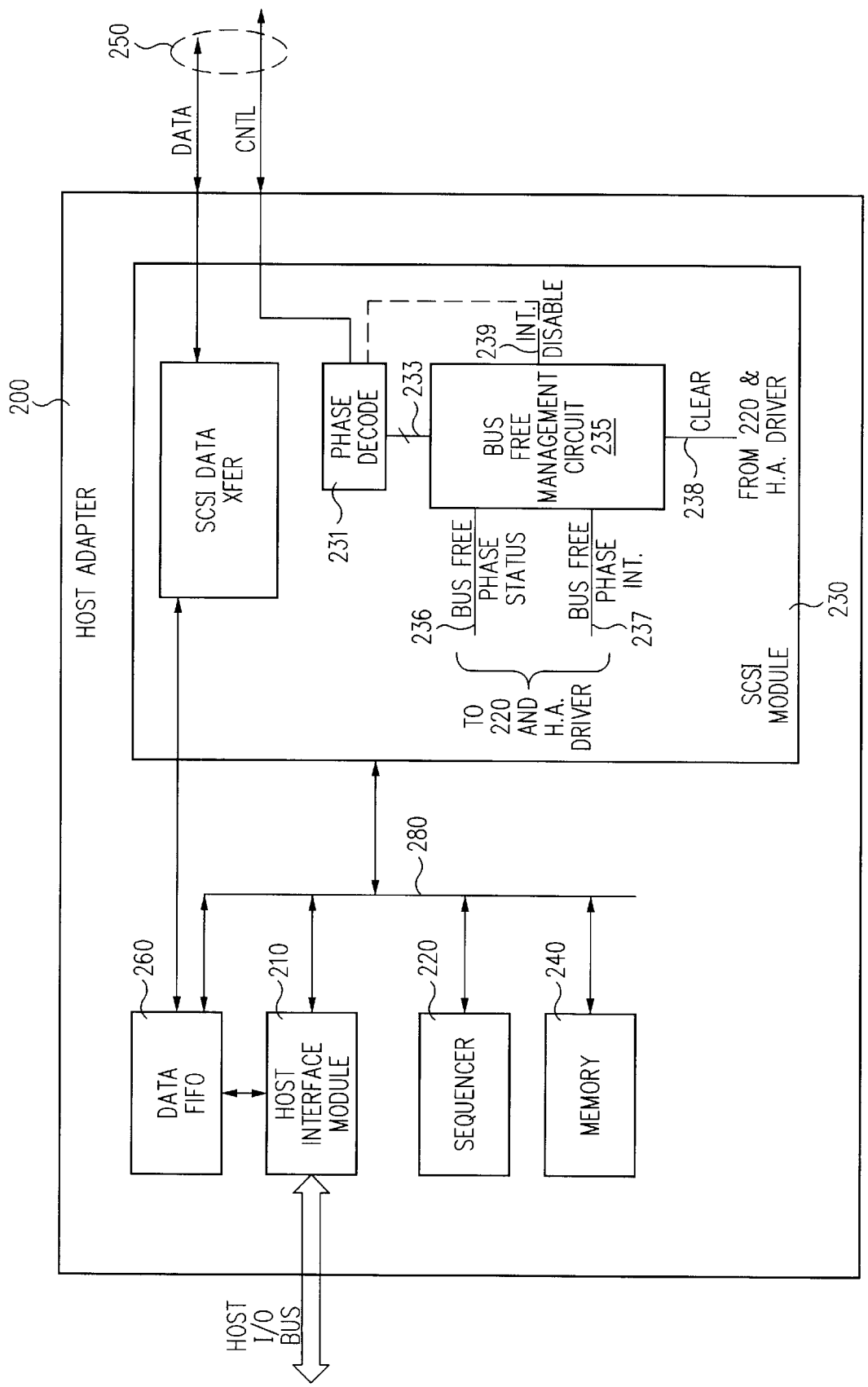
FIG. 2 is a diagram of a parallel SCSI host adapter integrated circuit with a SCSI Bus Free phase management circuit according to the principles of this invention.

In the embodiment of FIG. 2, a SCSI bus phase decoder 231 is coupled to lines in control bus CNTL of SCSI bus 250. Phase decoder 231 has a plurality of output lines 233 connected to input terminals of Bus Free management circuit 235 and coupled to terminals of integrated circuit 200 that interface with the control line of SCSI bus 250. As explained more completely below, plurality of output lines 233 includes a Bus Free line, a selection complete line, and a reselection complete line. The decoding of signals on control bus CNTL of SCSI bus 250 to determine the SCSI bus phase is well known to those of skill in the art and so is not considered further. See for example, Peter M. Ridge, *The Book of SCSI, A Guide for Adventurers*, Chapter 6, pp. 85 to 122, No Starch Press, Daly City, Calif. (1995), which is incorporated herein by reference as an example of the knowledge of one of skill in the art.

When either a selection or reselection is completed on SCSI bus 250, a signal is asserted from phase decoder 231 to circuit 235. In response to this active signal, circuit 235 automatically enables assertion of a signal on Bus Free phase status line 236 and Bus Free interrupt line 237.

After the completed selection or reselection, in one embodiment, sequencer 220 strobes Bus Free phase interrupt disable line 239 if a Bus Free phase is expected and otherwise holds the signal on line 239 inactive. In another embodiment, an automated hardware circuit within SCSI module 230 detects the bus phases and generates the strobe signal on line 239.

As described above, the sequence of SCSI bus phases is well known (See for example, FIG. 6.12 on page 98 of Ridge.), as is detection of the particular SCSI bus phases on SCSI bus 250. The determination of when a Bus Free phase is expected only requires detecting the SCSI bus phase with the automated hardware circuit, and comparing the detected phase with the phase or phases after which a Bus Free phase is expected. When the detected SCSI bus phase is one such that a Bus Free phase is expected to follow, an active signal is driven on line 239 by the automated hardware circuit, and otherwise the signal on line 239 is held inactive by the circuit. In one embodiment, the automated hardware circuit that drives line 239 is included within phase decode circuit 231.

In addition, as is known to those of skill in the art, sequencer 220 only executes instructions that in turn cause sequencer 220 to perform specific actions. Therefore, when it is stated that sequencer 220 takes an action, it should be interpreted to mean that sequencer 220 executes an instruction or sequence of instructions that result in the specified action.

When a Bus Free phase is detected on SCSI bus 250, phase decoder 231 asserts an active Bus Free phase signal on another of the plurality of output lines 233 to circuit 235. In response to the active Bus Free phase signal, circuit 235 drives an active signal on Bus Free phase status line 236. If the Bus Free interrupt was not disabled, circuit 235 also drives an active signal on Bus Free interrupt line 237.

Thus, SCSI module 230 automatically enables generation of a Bus Free phase status signal and interrupt without intervention of any processor, and generates the signals automatically upon SCSI bus 250 entering a Bus Free phase. Moreover, after sequencer 220 processes the Bus Free phase, sequencer 220 strobes clear line 238 which resets the active signals on lines 236 and 237.

The status signal and interrupt from circuit 235 can be reset before another selection or reselection is completed unlike the prior art host adapter integrated circuit that only could reset these signals after another selection or reselection was completed. Consequently, when another selection or reselection is completed, host adapter 200 does not have to use sequencer 220 to reset these signals and thereby saves time in responding to the first request signal from the target device. Also, the Bus Free phase status signal and interrupt are automatically enabled by a selection done or a reselection done rather than by sequencer 220 which provides further saving in response time to a request signal REQ.

Figure 3:
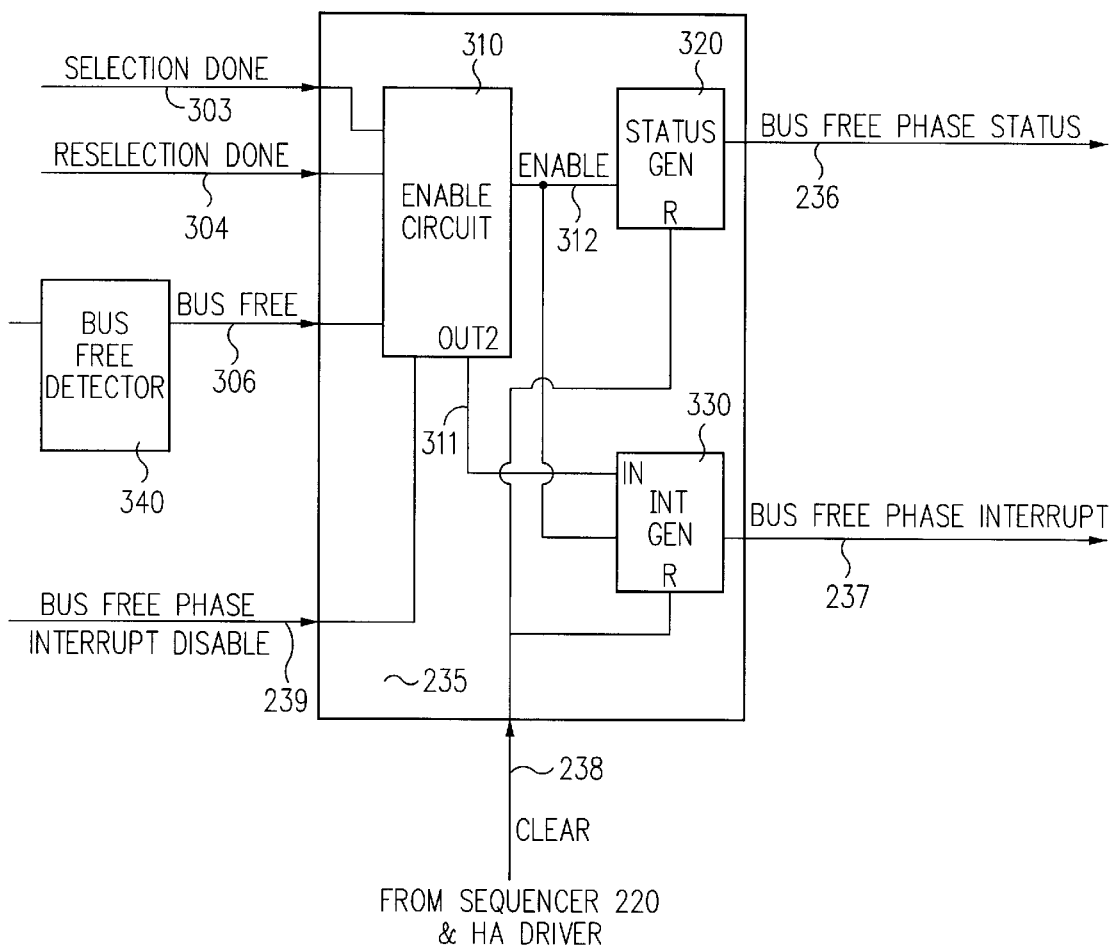
FIG. 3 is a more detailed block diagram of the SCSI Bus Free phase management circuit according to the principles of this invention.

FIG. 3 is a more detailed block diagram of Bus Free management circuit 235. Bus Free management circuit 235 has two output lines 236 and 237 that are sometimes referred to herein as a Bus Free phase status line 236 and a Bus Free phase interrupt line 237. Bus Free management circuit 235 automatically generates an active signal on Bus Free phase status output line 236 whenever the phase of SCSI bus 250 is a Bus Free phase. Bus Free management circuit 235 automatically generates an active signal on Bus Free phase interrupt line 237 when a Bus Free phase interrupt is enabled and a Bus Free phase occurs unexpectedly on SCSI bus 250. Herein, a Bus Free phase interrupt means that an active signal is generated on output line 237.

Either a successful selection or a successful reselection automatically enables both the Bus Free phase status signal and the interrupt. Specifically, an enable circuit 310 in Bus Free management circuit 235 is enabled whenever there is an active signal 401 (FIG. 4A) on either one of selection done input line 303 or reselection done input line 304 to enable circuit 310. When enable circuit 310 is enabled, an active signal is generated on an output line 311 to interrupt generation circuit 330.

Since the Bus Free phase interrupt is automatically enabled, sequencer 220 generates an active signal 402 on interrupt disable input line 239 to enable circuit 310 whenever sequencer 220 expects a Bus Free phase on SCSI bus 250. Alternatively, as described above, an automated hardware circuit within SCSI module 230 detects the SCSI bus phases and generates active signal 402 when a Bus Free phase is expected.

In response to active interrupt disable signal 402, enable circuit 310 generates an inactive signal on the output line to interrupt generation circuit 330. In one embodiment, the signal on line 239 is a strobe. When the Bus Free phase interrupt is disabled, the interrupt remains disabled until the next selection or reselection is completed, i.e., when a subsequent active signal 410 is received by circuit 235 on one of input lines 303 and 304, at which time the Bus Free phase interrupt is again automatically enabled.

Bus Free management circuit 235 automatically drives an active signal 405 on Bus Free Phase status line 236 to a register bit that is readable by sequencer 220 only after an active signal 401 is received on either of one of selection done input line 303 or reselection done input line 304 and an active signal 403 is received on Bus Free phase input line 306.

Specifically, when enable circuit 310 receives an active signal on Bus Free phase input line 306, circuit 310 generates an active signal on enable line 312 to status generation circuit 320 and interrupt generation circuit 330. In response to the active signal on enable line 312, status generation circuit 320 drives an active signal on Bus Free phase status output line 236. In response to the active signal on enable line 312, interrupt generation circuit 330 passes the signal level on line 311 to Bus Free phase interrupt line 237.

Bus Free phase input line 306 can be driven by a level detector 340 similar to that in the prior art. Thus, an active signal 403 is driven on Bus Free phase input line 306 when host adapter integrated circuit 200 detects a Bus Free phase on SCSI bus 250.

Bus Free phase status signal 405 on Bus Free phase status line 236 cannot be disabled by sequencer 220. The Bus Free phase status signal remains enabled from the time an active signal 401 is received on either of one of selection done input line 303 or reselection done input line 304 until the occurrence of the Bus Free phase. An active signal is expected on Bus Free phase input line 306 when the Bus Free phase interrupt has been disabled, and is unexpected when the Bus Free phase interrupt has been enabled.

In this embodiment, Bus Free management circuit 235 latches the signals on Bus Free phase status output line 236 and Bus Free phase interrupt output line 237. Thus, when the signals on lines 236 and 237 are asserted, the signals remain asserted until the signals are manually cleared by either sequencer 220 or the host adapter driver (not shown) manually asserting a clear signal on clear line 238. Hence, active signal 405 on output line 236 remains asserted until the signal is manually cleared by sequencer 220 or the host adapter driver driving an active signal 404 on clear line 238.

The SCSI Bus Free phase that results in generation of an active signal on Bus Free phase input line 306 can be very short. Thus, by the time either sequencer 220 or the host adapter driver (not shown) observes the Bus Free phase status, any target device on SCSI bus 250 may have reselected host adapter integrated circuit 200. The latching of the active Bus Free phase status signal on output line 236 assures that either sequencer 220 or the host adapter driver can observe and therefore be aware of the Bus Free phase on SCSI bus 250.

This is necessary because sequencer 220 uses the Bus Free phase status to determine when a target has actually disconnected from SCSI bus 250. Alternatively, a target device may not enter the Bus Free phase when expected by sequencer 220, and could, for example, assert a request signal REQ because the target device detected an error during a previous SCSI bus phase.

As described above, active signal 410 on one of input lines 303 and 304 enables the Bus Free phase interrupt. Consequently, if a Bus Free phase is expected after the selection done or reselection done, a strobe is driven on line 239, e.g., sequencer 220 asserts signal 411 on interrupt disable line 239 or alternatively, the hardware circuit within phase decoder 231 generates that strobe.

Active signal 412 on Bus Free phase input line 306 drives an active signal 412 on Bus Free phase status line 236. After observing the Bus Free phase status, sequencer 220 asserts an active signal 414 on clear line 238 to clear the status. If SCSI bus 250 is still in the Bus Free phase after the status is cleared by sequencer 220, i.e., an active signal 412 remains on Bus Free phase input line 306, the Bus Free phase status signal is not reasserted on Bus Free phase status output line 236. After the status is cleared by sequencer 220, a selection or reselection must complete, before Bus Free management circuit 235 reasserts an active Bus Free phase status signal on output line 236 in response to the signal on Bus Free phase input line 306.

Yet another active signal 420 on one of input lines 303 and 304 enables the Bus Free phase interrupt again. If a Bus Free phase is expected after the selection done or reselection done, interrupt disable line 239 is again strobed, e.g., sequencer 220 asserts signal 424 on line 239.

Active signal 422 on Bus Free phase input line 306 drives an active signal 427 on Bus Free phase status line 236. Prior to sequencer 220 observing the current Bus Free phase status indicated by signal 427, there is another selection done or reselection done on SCSI bus 250 as indicated by active signal 421. An active signal is not generated on Bus Free phase interrupt line 237 after a selection done or reselection done, e.g. active signal 421, by an active Bus Free phase status signal 427 that was asserted before the selection done or reselection done and not yet cleared by sequencer 220. However, as noted above active signal 421 does enable the Bus Free phase interrupt. After observing the Bus Free phase status, sequencer 220 asserts an active signal 425 on clear line 238 to clear the active status signal 427.

There can be only one expected Bus Free phase when sequencer 220 clears active Bus Free phase status signal 427. If another selection or reselection has completed when sequencer 220 performs the clear as indicated by active signal 421, sequencer 220 has not serviced the new selection or reselection. Thus, another Bus Free phase is not expected.

Consequently, when an active signal 423 is received on Bus Free phase input line 306, circuit 235 drives active signals 428 and 429 on output lines 236 and 237. Active signal 429 on Bus Free phase interrupt line 237 signals the host adapter driver (not shown) that host adapter integrated circuit 200 needs assistance.

In response to the interrupt, the host adapter driver scans status bits in host adapter integrated circuit 200 to determine the cause of the interrupt. The active signal on line 236 directs the host adapter driver (not shown) to take corrective action for the unexpected Bus Free phase.

The Bus Free phase interrupt on output line 237 must remain asserted long enough for the host adapter driver (not shown) to response to the interrupt. The corresponding active signal on output line 236 must remain asserted for the interrupt handler within driver 265 to determine that the cause of the interrupt was an unexpected Bus Free phase.

In handling the interrupt, the host adapter driver (not shown) clears the active signal on output lines 236 and 237 by driving an active signal 426 on clear line 238. The host adapter driver (not shown) does not drive an active signal on interrupt disable line 239 to disable the interrupt in the event that there has been another selection or reselection completed since the unexpected Bus Free phase on SCSI bus 250.

An unexpected Bus Free phase can occur after a selection or reselection is completed, but before sequencer 220 has observed the selection or reselection. For example in FIG. 4B, active signal 430 on one of input lines 303 and 304 enables the Bus Free phase interrupt again. If sequencer 220 is expecting a Bus Free phase after the selection done or reselection done, sequencer 220 again strobes interrupt disable line 239.

Active signal 432 (FIG. 4B) on Bus Free phase input line 306 drives an active signal 436 on Bus Free phase status line 236. Prior to sequencer 220 observing the current Bus Free phase status indicated by signal 436, there is another selection done or reselection done on SCSI bus 250 as indicated by active signal 431.

Note that again an active signal is not generated on Bus Free phase interrupt line 237 after a selection done or reselection done, e.g. active signal 431, by an active Bus Free phase status signal 427 that was asserted before the selection done or reselection done and not yet cleared by sequencer 220. However, as noted above active signal 421 does enable the Bus Free phase interrupt.

In this example, an unexpected Bus Free phase occurs, as indicated by active signal 433 before sequencer 220 has cleared active Bus Free phase status signal 436 following the previous selection or reselection that was indicated by signal 430. Since signal 431 enabled a Bus Free interrupt, signal 433 on Bus Free phase input line 306 causes circuit 235 to drive an active signal 437 on Bus Free phase interrupt line 237 to the host adapter driver (not shown).

Before the host adapter driver (not shown) can respond to interrupt 437, sequencer 220 generates an active signal on clear line 238 to reset Bus Free phase status signal 436 associated with signal 430. However, clear signal 435 also resets the status and interrupt signals generated in response to signal 431. Consequently, when the host adapter driver (not shown) handles the interrupt, the host adapter driver (not shown) does not recognize the source of the interrupt as an unexpected Bus Free phase on SCSI bus 250 and so takes no corrective action. However, since sequencer 220 had not begun to service the selected or reselecting target, no corrective action is required.

Figure 4A:
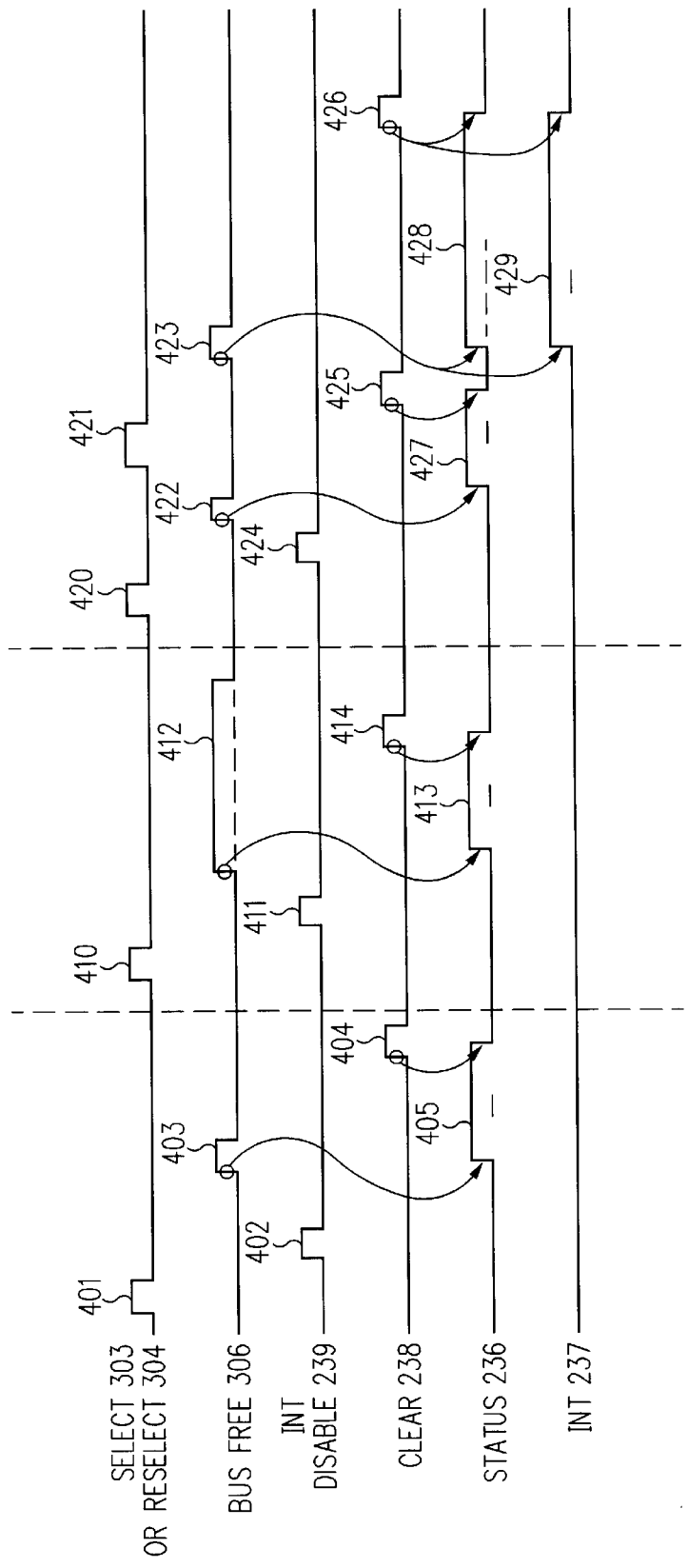
Figure 5:
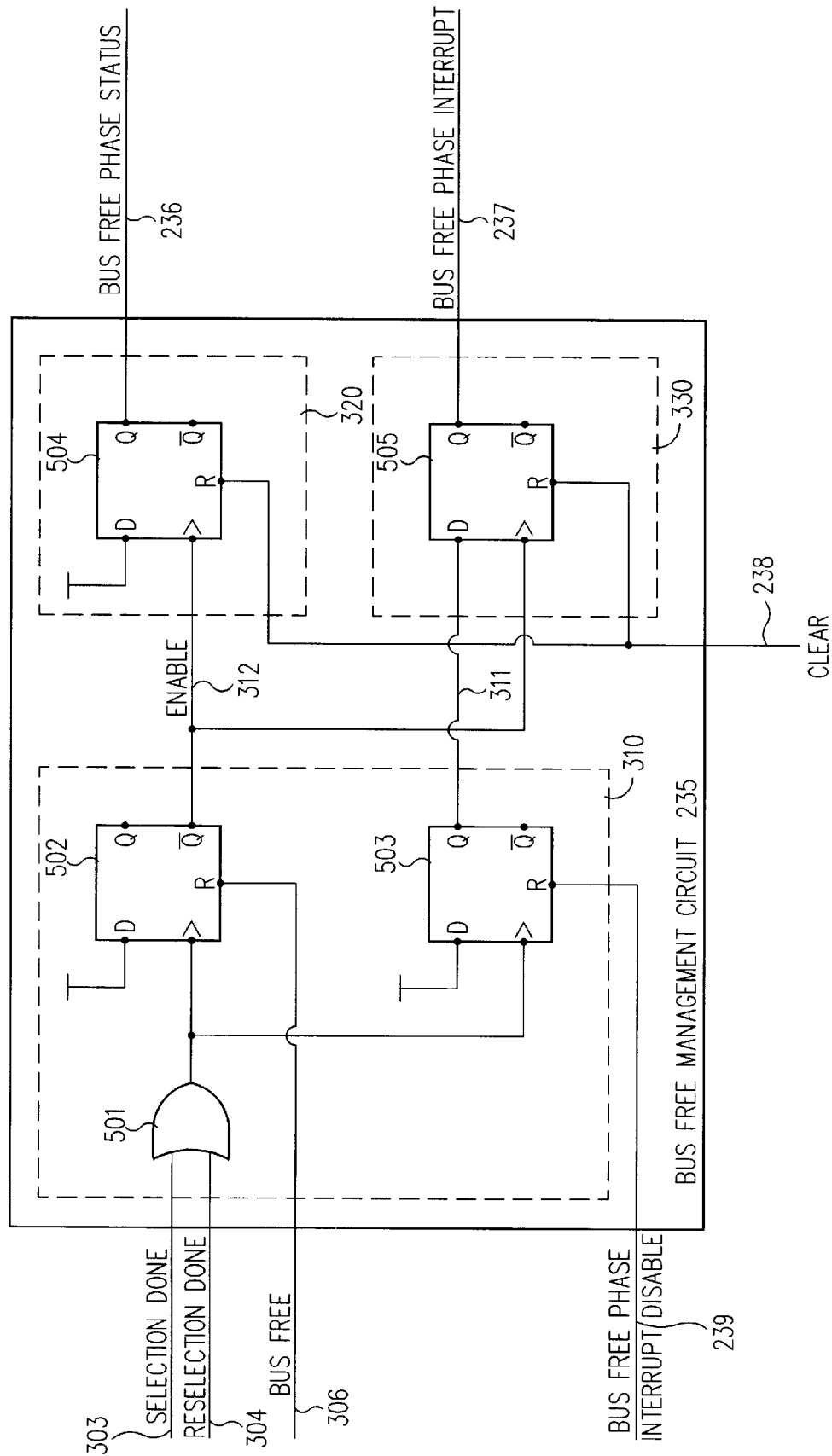
FIG. 5 is a schematic of one embodiment of the SCSI Bus Free phase management circuit according to the principles of this invention.

In view of the above description of FIGS. 2 and 3 and the timing diagrams in FIGS. 4A and 4B, one of skill in the art can implement circuit 235 in several different ways. Therefore, the implementation presented in FIG. 5 is only illustrative of the principles of this invention and is not intended to limit the invention to the particular embodiment described.

In this embodiment of Bus Free management circuit 235, selection done input line 303 is connected to a first input terminal of OR gate 501 (FIG. 5) and reselection done input line 304 is connected to a second input terminal of OR gate 501. An output terminal of OR gate 501 is connected to a clock terminal of a first D-type flip-flop 502 and to a clock terminal of a second D-type flip-flop 503. Input terminals D of flip-flops 502 and 503 are connected to a power supply voltage.

Thus, when a signal is asserted on either one of inputs lines 303 and 304, the rising edge of the signal clocks a logic one level signal on output terminal Q of flip-flop 503 and a logic zero level signal on output terminal /Q of flip-flop 502. Output terminal /Q of flip-flop 502 is connected to a clock terminal of a third flip-flop 504 and to a clock terminal of a fourth flip-flop 505. Hence, when the signal on output terminal /Q goes to a logic one level, the logic one level signal on input terminal D of flip-flop 505 is clocked to output line 236 that is connected to output terminal Q of flip-flop 504. The signal on input terminal D of flip-flop 505 that is connected to output terminal Q of flip-flop 503 similarly is clocked to output line 237 that is connected to output terminal Q of flip-flop 505.

Since the output signal of OR gate 501 clocked a logic one level signal to output terminal Q of flip-flop 503, there is a logic one level signal on input terminal Q of flip-flop 505. Thus, circuit 235 enables a Bus Free phase interrupt by applying a logic level one signal to the input terminal of flip-flop 505 in response to assertion of a signal on either of input lines 303 and 304.

Bus Free phase input line 306 is connected to an asynchronous reset terminal R of flip-flop 502. The signal on line 306 is inactive when a signal is asserted on either of lines 303 or 304. Thus, the signal on line 306 does not inhibit the enablement of generation of the Bus Free phase status signal and the Bus Free phase interrupt.

When an active signal is driven on Bus Free phase input line 306, the signal level on output terminal/Q of flip-flop 502 transitions from a logic zero level to a logic one level. The rising edge from output terminal/Q of flip-flop 502 drives active signals on output terminals Q of flip-flops 504 and 505.

However, if after the active signal on input line 303 or 304, line 239 that is connected to an asynchronous reset terminal of flip-flop 503 is strobed, there is a logic zero level signal on output terminal Q of flip-flop 503 to input terminal D of flip-flop 505. Consequently, the active signal on Bus Free phase input line 306 clocks a logic zero level signal onto Bus Free phase interrupt line 237. Consequently, generation of a Bus Free phase interrupt is inhibited by strobing Bus Free phase interrupt disable line 239 after a selection done or reselection done.

Clear line 238 is connected to the asynchronous reset terminals R of flip-flops 504 and 505. Thus, sequencer 220 or the host adapter driver (not shown) can reset the signals on lines 236 and 237 by strobing clear line 238.

A comparison of the timing diagrams in FIGS. 4A and 4B with the operation of the circuit in FIG. 5 shows that the circuit responds as indicated in those Figures. Consequently, the description of those figures is not repeated citing to the various components in FIG. 5.

It is important to note that the Bus Free phase status signal and interrupt can be cleared by sequencer 220 prior to another selection or reselection by a target device instead of after another selection or reselection, i.e., independent of another selection or reselection, thereby saving time in responding to the first request signal from the target device. Also, the Bus Free phase status signal and interrupt are automatically enabled by a selection done or a reselection done rather than by sequencer 220 which provides further saving in response time to a request signal REQ.

The above embodiments of the invention are illustrative only of the principles of this invention are not intended to limit the invention to the particular examples presented.

I claim:

1. In a parallel SCSI host adapter intergrated circuit, a structure comprising:
    a Bus Free management circuit comprising:
        a plurality of input lines coulped to SCSI bus control terminals of said parallel SCSI host adapter intergrated circuit;
        a Bus Free phase interrupt disable line;
        a clear line;
        a Bus Free phase status line; and
        a Bus Free phase interrupt line;
            wherein said Bus Free management circuit atuomatically generates an active signal on said Bus Free phase status line following receipt of (i) one of a selection complete signal and a reselection complete signal on said of input lines; and (ii) a Bus Free phase signal on said plurality of input lines.

2. In a parallel SCSI host adapter integrated circuit, the structure of claim 1 further comprising:
    a circuit coupled to said clear line, to said Bus Free phase status line, and to said Bus Free phase interrupt disable line wherein said circuit generates an active signal on said Bus Free phase interrupt disable line when a Bus Free phase is expected; and said circuit generates an active signal on said clear line after determining that an active signal is on said Bus Free phase status line.

3. In a parallel SCSI host adapter integrated circuit, the structure of claim 1 wherein said Bus Free management circuit further comprises:
    an enable circuit coupled to said plurality of input lines and to said Bus Free phase interrupt disable line, and comprising an enable line and an output line.

4. In a parallel SCSI host adapter integrated circuit, the structure of claim 2 wherein said circuit comprises an on-chip sequencer.

5. In a parallel SCSI host adapter integrated circuit, the structure of claim 3 wherein said Bus Free management circuit further comprises:
    a status generation circuit connected to said enable line and to said clear line, and having an output terminal connected to said Bus Free phase status line.

6. In a parallel SCSI host adapter integrated circuit, the structure of claim 3 wherein said Bus Free management circuit further comprises:
    an interrupt generation circuit connected to said enable line, to said clear line, and to said output line, and having an output terminal connected to said Bus Free phase interrupt line.

7. In a parallel SCSI host adapter integrated circuit, the structure of claim 5 wherein said Bus Free management circuit further comprises:
    an interrupt generation circuit connected to said enable line, to said clear line, and to said output line, and having an output terminal connected to said Bus Free phase interrupt line.

8. A method comprising:
    enabling automatic hardware generation of a SCSI Bus Free phase status signal upon receipt of an active selection done signal or an active reselection done signal by a hardware circuit; and
    generating automatically an active Bus Free phase status signal upon receipt of an active SCSI Bus Free phase signal by said hardware circuit.

9. The method of claim 8 further comprising:
    enabling automatic hardware generation of a SCSI Bus Free phase interrupt signal upon receipt of said active selection done signal or said active reselection done signal.

10. The method of claim 8 further comprising:
    clearing said active Bus Free phase status signal prior to receipt of another active selection done signal or another active reselection done signal by said hardware circuit.

11. The method of claim 9 further comprising:
    disabling said automatic hardware generation of said SCSI Bus Free phase interrupt signal when a SCSI Bus Free phase is expected.

12. The method of claim 9 further comprising:
    generating automatically an active Bus Free phase interrupt upon receipt of said active SCSI Bus Free phase signal by said hardware circuit.

* * * * *